(12) United States Patent
Lagadec et al.

(10) Patent No.: US 11,016,915 B2
(45) Date of Patent: May 25, 2021

(54) METHOD FOR SENDING BY AN UPSTREAM DEVICE TO A DOWNSTREAM DEVICE DATA FROM A VIRTUAL CHANNEL SHARING A SAME INPUT BUFFER MEMORY OF THE DOWNSTREAM DEVICE, CORRESPONDING COMPUTER PROGRAM AND SYSTEM

(71) Applicant: BULL SAS, Les Clayes-sous-Bois (FR)

(72) Inventors: Pierre Axel Lagadec, Villeneuve Loubet (FR); Saïd Derradji, Issy les Moulineaux (FR); Dominique Rigal, Nice (FR); Laurent Marliac, Saint Laurent du Var (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/418,192

(22) Filed: May 21, 2019

(65) Prior Publication Data

US 2019/0361822 A1 Nov. 28, 2019

(30) Foreign Application Priority Data

May 22, 2018 (FR) ...................................... 1854232

(51) Int. Cl.
| | |
|---|---|
| *G06F 3/06* | (2006.01) |
| *G06F 13/16* | (2006.01) |
| *G06F 13/40* | (2006.01) |
| *G06F 13/38* | (2006.01) |
| *G06F 15/167* | (2006.01) |

(52) U.S. Cl.
CPC ........ *G06F 13/1673* (2013.01); *G06F 13/161* (2013.01); *G06F 13/38* (2013.01); *G06F 15/167* (2013.01)

(58) Field of Classification Search
CPC . G06F 3/0656; G06F 13/1673; G06F 13/4059
See application file for complete search history.

(56) References Cited

U.S. PATENT DOCUMENTS

| | | | | |
|---|---|---|---|---|
| 2003/0115380 | A1* | 6/2003 | Ajanovic ............ | G06F 13/4269 710/1 |
| 2004/0103218 | A1* | 5/2004 | Blumrich ................ | G06F 9/526 709/249 |
| 2013/0051397 | A1* | 2/2013 | Guo ........................ | H04L 45/00 370/400 |

OTHER PUBLICATIONS

Seitanidis, I., et al. "ElastiStore : Flexible Elastic Buffering for Virtual-Channel-Based Networks on Chip," IEEE Transactions on Very Large Scale Integration (VLSI) Systems, vol. 23, No. 12, Dec. 2015, XP011590954, pp. 3015-3027.

(Continued)

*Primary Examiner* — David E Martinez
(74) *Attorney, Agent, or Firm* — Arc IP Law, PC; Joseph J. Mayo

(57) ABSTRACT

A method for sending data, from an upstream device to a downstream device, including sending a piece of data from one among a plurality of virtual channels sharing the same input buffer memory of the downstream device, if this virtual channel uses a number of memory locations of the input buffer memory strictly less than a current ceiling. It further comprises measuring a communication latency between the upstream and downstream devices, and calculating the current ceiling from the measured latency.

10 Claims, 2 Drawing Sheets

(56) References Cited

OTHER PUBLICATIONS

Kung, H. T., et al., "The FCVC (Flow-Controlled Virtual Channels) Proposal for ATM Networks: A Summary," 1993 International Conference on Network Protocols, Jan. 1993, XP055547247, pp. 116-127.

Zhang, Y., et al., "Express Router Microarchitecture for Triplet-based Hierarchical Interconnection Network," 2012 IEEE $14^{th}$ International Conference on High Performance Computing and Communications, Jun. 2012, XP032255283, pp. 295-302.

Search Report as issued in French Patent Application No. 1854232, dated Jan. 25, 2019.

\* cited by examiner

METHOD FOR SENDING BY AN UPSTREAM DEVICE TO A DOWNSTREAM DEVICE DATA FROM A VIRTUAL CHANNEL SHARING A SAME INPUT BUFFER MEMORY OF THE DOWNSTREAM DEVICE, CORRESPONDING COMPUTER PROGRAM AND SYSTEM

CROSS-REFERENCE TO RELATED APPLICATIONS

This application claims priority to French Patent Application No. 1854232, filed May 22, 2018, the entire content of which is incorporated herein by reference in its entirety.

FIELD

This invention relates to a method for sending data, as well as a corresponding computer program and system.

BACKGROUND

The invention more particularly applies to a method for sending data from an upstream device to a downstream device, comprising:
  the sending of a piece of data from one among a plurality of virtual channels sharing the same input buffer memory of the downstream device, if this virtual channel uses a number of memory locations of the input buffer memory strictly less than a current ceiling.

For example, the upstream and downstream devices belong to a system comprising nodes and an interconnection network for the nodes comprising switches and communication links that connect the switches together and to the nodes. Each one of the upstream and downstream devices is then either one of the nodes or one of the switches. The switches and the nodes comprise connection ports to which the communication links are connected.

In this framework, it is known to arbitrarily set the current ceiling, to the same value for all of the input buffer memories present in the system. This value is chosen large so that each virtual channel has at its disposition enough memory locations so that the data of this virtual channel is sent in a fluid manner.

A problem with this solution is that it requires using high-capacity input buffer memories.

It can thus be desired to provide a method for sending data that makes it possible to overcome at least one portion of the aforementioned problems and constraints.

SUMMARY

In an aspect of the invention, a method is proposed for sending data from an upstream device to a downstream device, comprising:
  the sending of a piece of data from one among a plurality of virtual channels sharing the same input buffer memory of the downstream device, if this virtual channel uses a number of memory locations of the input buffer memory strictly less than a current ceiling.
  the measuring of a communication latency between the upstream and downstream devices,
  the calculating of the current ceiling from the latency.

Indeed, the length of the communication links is not uniform between the nodes of the system. Thanks to an aspect of the invention, it is possible to calculate a different ceiling for each pair of upstream and downstream devices. The ceiling is always calculated as best as possible according to the communication latency which depends on the actual length of the communication link, which makes it possible to use per virtual channel only the quantity of memory required while still retaining good performance.

Optionally, the measuring of the latency comprises the measuring of a time taken by an exchange of messages between the upstream and downstream devices.

Also optionally, the method further comprises:
  the determining of a utilization rate of the input buffer memory, and the current ceiling is calculated from the latency and from the utilization rate.

Also optionally, the calculating of the current ceiling comprises:
  the calculating of several possible ceilings from the latency,
  the selecting, as the current ceiling, of one of the possible ceilings from the utilization rate.

Also optionally, the possible ceilings are respectively associated with adjacent intervals of utilization rates, and the possible ceiling selected is the one in which the determined utilization rate is located.

Also optionally, a lower interval and an upper interval which are adjacent are delimited from one another by a threshold taking a high value when the possible ceiling selected is the one associated with the lower interval and a low value, less than the high value, when the possible ceiling selected is the one associated with the upper interval.

Also optionally, the method further comprises:
  the calculating, from the latency, of a reserved number of memory locations for each virtual channel,
and the piece of data is sent if the virtual channel uses a number of memory locations strictly less than the ceiling and if the input buffer memory has more free memory locations than free reserved locations for all of the virtual channels.

Also optionally, the upstream and downstream devices belong to a system comprising:
  nodes,
  an interconnection network for the nodes comprising switches and
  communication links that connect the switches together and to the nodes, each on the upstream and downstream devices being either one of the nodes or one of the switches.

In another aspect of the invention, a computer program is proposed that can be downloaded from a communication network and/or recorded on a non-transitory medium that can be read by a computer and/or that can be executed by a processor, comprising machine readable instructions for the execution of steps of a method according to the invention, when the program is executed on a computer.

In another aspect of the invention, a system is proposed for sending data comprising:
  a downstream device comprising an input buffer memory,
  an upstream device designed to send a piece of data from one among a plurality of virtual channels sharing the input buffer memory, if this virtual channel uses a number of memory locations of the input buffer memory strictly less than a current ceiling,
  for a measuring system configured to measure a communication latency between the upstream and downstream devices,
  for a calculating system configured to calculate the current ceiling from the latency.

BRIEF DESCRIPTION OF THE DRAWINGS

The invention shall be better understood using the following description, provided solely as an example and given in reference to the accompanying drawings wherein.

DETAILED DESCRIPTION

Figure 1:
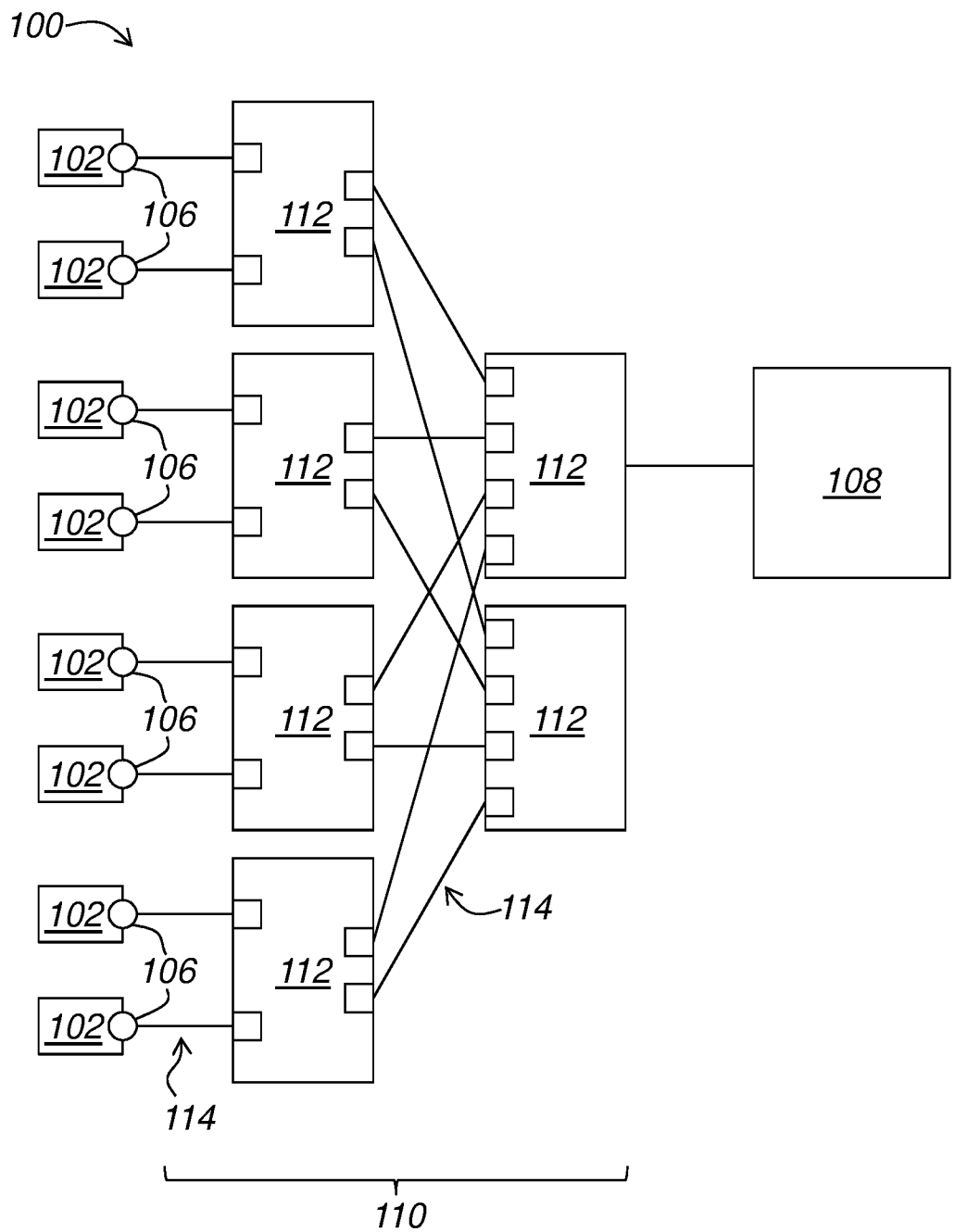
FIG. 1 diagrammatically shows the general structure of a system, according to an embodiment of the invention, FIG. 2 diagrammatically shows the general structure of an upstream device and of a downstream device of the system of FIG. 1.

In reference to FIG. 1, a system 100 implementing an aspect of the invention shall now be described.

The system 100 groups together independent computer devices 102 that appear from outside such as a single computer with a very high calculation power, called high-performance processing computer or supercomputer or HPC (for High Performance Computing) computer.

Each computer device 102 comprises at least one network interface. Each computer device 102 can further comprise a central processing unit, a main memory wherein instructions for the central processing unit are intended to be recorded (such a computer device 102 is then referred to as a calculation device) and/or a data storage device (such a computer device is then referred to as an input/output (IO) device), such as a mass memory such as one or several hard drives, for the recording and/or the recovery of data for example used and/or produced by the calculation computer devices.

The network interfaces respectively form nodes 106 of the system 100. Several network interfaces (and therefore several nodes 106) can belong to the same computer device 102, or, as in the example described, each computer device 102 can comprise only a single network interface forming one of the nodes 106. A node 106 formed by a network interface of a calculation computer device 102 is called "calculation node", while a node 106 formed from a network interface of an input/output computer device 102 is called "input/output node".

The system 100 further comprises an administration server 108. The administration server 108 is in particular designed to dialog with clients that want to use the system 100, the latter then being seen by the clients as a single computer. The administration server 108 is furthermore designed to sequence, between the calculation computer devices, tasks received from clients.

Such a system 100 allows for the distribution of complex processing and/or of parallel calculations over at least one portion of the calculation computer devices.

The system 100 further comprises an interconnection network 110 of nodes 106.

The network 110 comprises switches 112 and communication links 114 that connect the switches 112 together and to the nodes 106. Each switch 112 and each node 106 has several connection ports (represented by small squares in FIG. 1 for the switches 112) and each communication link 114 is connected between a connection port of a switch 112 and either a connection port of another switch 112 or a connection port of a node 106.

The system 100 has a certain topology defining the relative arrangement of the nodes 106, switches 112 and communication links 114. In the example described, the topology is that of a parallel generalized fat tree (PGFT).

Figure 2:
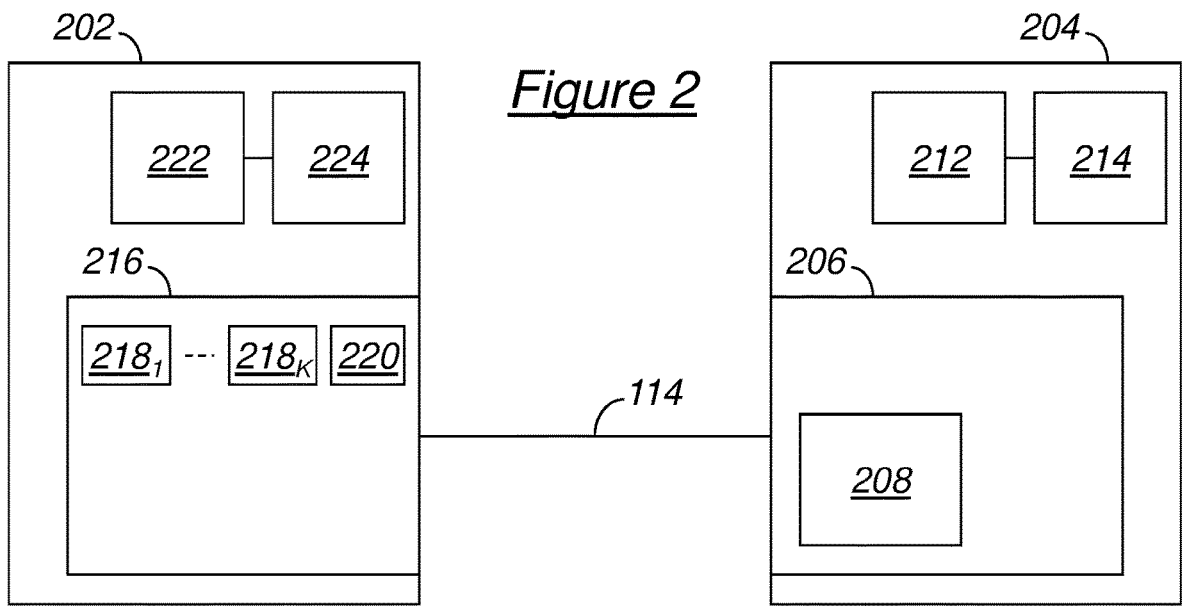

In reference to FIG. 2, an upstream device 202, a downstream device 204 and a communication link 114 connecting them, shall now be described. In the example described, the upstream 202 and downstream 204 devices are two of the switches 112 in FIG. 1. Alternatively, one of the upstream 202 and downstream 204 devices could be one of the nodes 106.

In the example described, the ports and communication links 114 are bidirectional. Thus, each switch 112 and each node 106 is both a downstream device and an upstream device. Thus, each one of its ports is both an input port and an output port, in such a way that it comprises all of the elements that will be described for both the output port of the upstream device 202 and the input port of the downstream device 204.

The downstream device 204 comprises an input port 206 to which the communication line 114 is connected for data reception. The input port 206 supports a predetermined number K of virtual channels and a throughout D of for example 25 GB/s. The input port 206 comprises an input buffer memory 208 that has a certain number of memory locations each intended to receive a unit of data, this number being called the capacity C of the input buffer memory 208. In the example described, the unit of data is a FLow control unIT (FLIT) which is comprised of 32 bytes. The capacity C of the input buffer memory 208 is for example 4096 FLITs.

The downstream device 204 further comprises a processing unit 212, such as a microprocessor, and a memory 214 operationally coupled to the processing unit 212 and comprising a computer program comprising instructions for the processing unit 212.

The upstream device 202 comprises an output port 216 to which the communication link 114 is connected. The output port 216 supports the same predetermined number K of virtual channels and the same throughput D as the input port 206. It comprises credit counters $218_1 \ldots 218_K$ for respectively the K virtual channels, as well as a usage counter 220 of the input buffer memory 208 intended to count the memory locations used by all of the virtual channels. Thus, the input buffer memory 208 has a utilization rate TU equal to the ratio between the value of the usage counter 220 and the capacity C of the input buffer memory 208.

The upstream device 202 further comprises a processing unit 222, such as a microprocessor, and a memory 224 operationally coupled to the processing unit 222 and comprising a computer program comprising instructions for the processing unit 222.

Thus, in the example described, the upstream 202 and downstream 204 devices comprise software means, in the form of a computer program that can be downloaded from a communication network and/or recorded on a medium that can be read by a computer and/or that can be executed by a processor, comprising instructions for the execution of the steps of the method that shall be described hereinafter when the computer program is executed on the upstream 202 and downstream 204 devices. Alternatively, all or a portion of these means could be micro-programmed or micro-wired hardware means in dedicated integrated circuits. Thus, alternatively, the upstream 202 and downstream 204 devices could each be an electronic device comprised solely of digital circuits (without a computer program) for carrying out the same actions.

Moreover, the capacity C of the input buffer memory 208 and the throughput D are recorded in memory 224 in order to allow for the use thereof in the calculations that will be described hereinafter.

Figure 3:
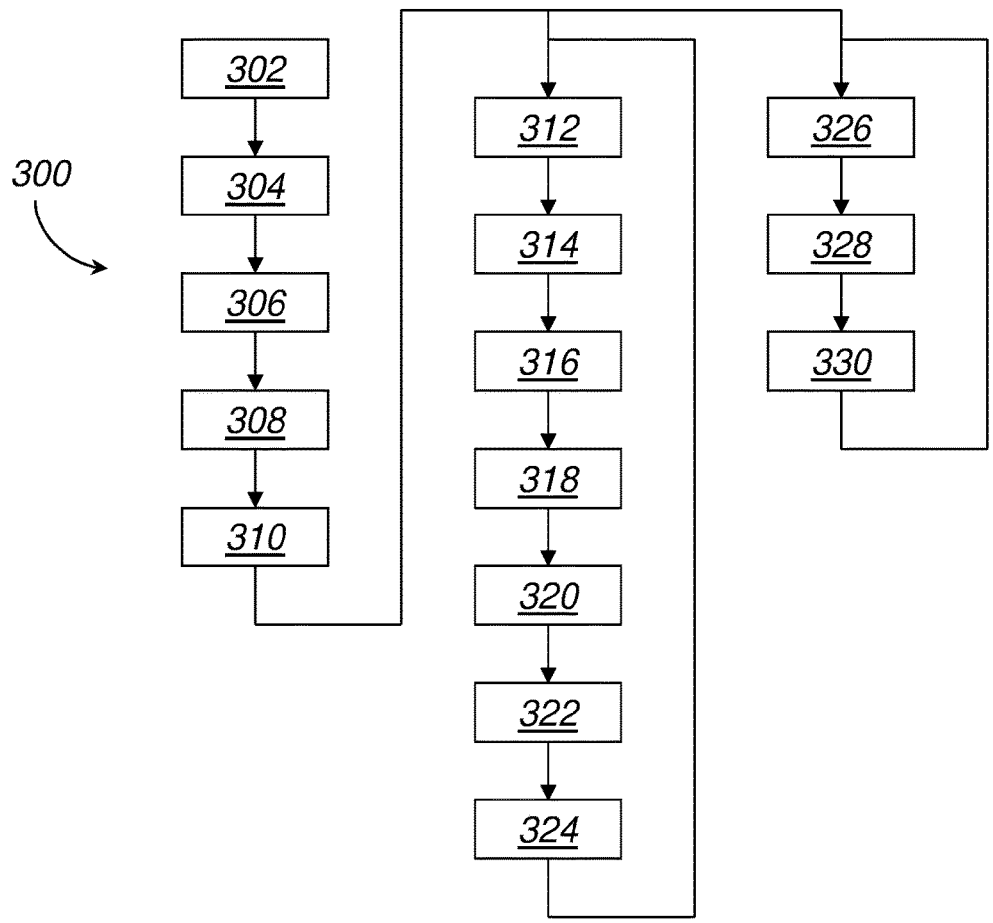
FIG. 3 shows the successive steps of a method for sending data from the upstream device to the downstream device of FIG. 2, according to an embodiment of the invention.

In reference to FIG. 3, a method 300 for sending data from the upstream device 202 to the downstream device 204 shall now be described.

During a step 302, the upstream device 202 measures a communication latency (noted as L in what follows) between the upstream 202 and downstream 204 devices.

In the example described, during the start-up thereof, the system 100 implements an initialization phase during which the switches 112 exchange initialization messages between them and with the nodes 106. These exchanges are used to determine the latency L, by measuring a time taken by an exchange of messages between the upstream 202 and downstream 204 devices during the initialization phase. More precisely, the upstream device 202 sends a first initialization message to the downstream device 204, via the communication link 114. The downstream device 204 receives the first initialization message and, in response, sends a second initialization message to the upstream device 202, still via the communication link 114. The upstream device 202 then receives this second initialization message. This reception is separate from the sending of the first initialization message by a certain time, that the upstream device 202 measures. In the example described, the latency L corresponds to this measured time.

During a step 304, the upstream device 202 calculates, for each one of a plurality of adjacent intervals of the utilization rate TU of the input buffer memory 208, a possible ceiling from the latency L. As shall be described in what follows, each one of these possible ceilings is intended to be selected in order to form a current ceiling P that represents a maximum number of memory locations that can be used by each virtual channel.

For example, each one of these possible ceilings is calculated from the latency L and from the throughput D of the output port to which the communication link 114 is connected.

In an embodiment, each possible ceiling has a minimum value equal to the capacity C of the input buffer memory 208 divided by the number of virtual channels K. For example, with the capacity C equal to 4096 memory locations and the number of virtual channels K equal to 20, the minimum value of the possible ceilings is 205 memory locations.

In an embodiment, the possible ceilings are decreasing by one interval to the next, in the increasing direction of the utilization rate.

In the example described, two intervals are used. The first interval corresponds to a utilization rate TU less than or equal to 75% and the second interval corresponds to a utilization rate TU strictly greater than 75%. The first interval is associated with a first possible ceiling P1 given in the example described by the formula: P1=max (L×D; C/K), where L is the latency, D is the throughput (as the number of FLITs), C is the capacity of the input buffer memory 208 and K is the number of virtual channels. For example, if the latency L measured is 400 ns and if the throughput (in bytes) is 25 GB/s (or $0.78125 \times 10^9$ FLITs/s), the first possible ceiling P1 is 313. The second interval is associated with a second possible ceiling (noted as P2) given in the example described by the formula: P2=max (50%×L×D; C/K), where L is the latency, D is the throughput (as a number of FLITs), C is the capacity of the input buffer memory 208 and K is the number of virtual channels. For example, is the latency L measured is 400 ns and if the throughput (in bytes) is 25 GB/s (or $0.78125 \times 10^9$ FLITs/s), 50%×L×D is 157, in such a way that the second possible ceiling P2 takes the minimum value of 205.

It will be appreciated that two adjacent intervals, one (called the lower interval) being located under the other (called the upper interval) in the increasing direction of the utilization rate TU, are delimited from one another by a threshold. In the example described, the threshold that separates the two intervals is 75% and is fixed. However, in other embodiments, the threshold could vary according to a phenomenon of hysteresis. More precisely, when the possible ceiling selected is the one associated with the lower interval, the threshold takes a high value while when the possible ceiling selected is the one associated with the upper interval, the threshold takes a low value, less than the high value. For example, when the possible ceiling P1 is selected, the threshold for passing to the second interval is 80%, while when the possible ceiling P2 is selected, the threshold for passing to the lower interval is 70%. This phenomenon of hysteresis avoids frequent changes of the current ceiling P when the occupancy rate TU fluctuates around the threshold.

During a step 306, the upstream device 202 calculates a number of reserved memory locations per virtual channel (this number being noted as $N_R$) from the latency L. In the example described, the following formula is used: $N_R=10\% \times L \times D$, where L is the latency and D is the throughput (as a number of FLITs).

During a step 308, the upstream device 202 selects the first possible ceiling P1 as the current ceiling P. In the example described, this step is carried out by initializing each credit counter $218_1 \ldots 218_K$ to the first number P1.

During a step 310, the upstream device 202 initializes the usage counter 220 to zero.

Afterwards, the first following loop of steps is implemented each time that the upstream device 202 seeks to send an FLIT, of which the virtual channel is noted as k1, to the downstream device 204 via the communication link 114.

During a step 312, the upstream device 202 determines the utilization rate TU of the input buffer memory 208, for example using the capacity C of the input buffer memory 208 and of the usage counter 220.

During a step 314, the upstream device 202 selects, as the current ceiling P, the number associated with the interval wherein the determined utilization rate TU is found.

During a step 316, if the ceiling P has changed following the step 314, the upstream device 202 calculates the difference between the old ceiling P and the new ceiling P and applies this difference to each credit counter $218_1 \ldots 218_K$.

For example, if the current ceiling P was, before the step 314, the possible ceiling P2 and if the current ceiling P is, at the end of the step 314, the possible ceiling P1, then the difference is P1−P2, or 313−205=108 by taking again the example developed hereinabove. Thus, 108 credits are added to each credit counter $218_1 \ldots 218_K$.

Otherwise, if the current ceiling P was, before the step 314, the possible ceiling P1 and if the current ceiling P is, at the end of the step 314, the possible ceiling P2, then the difference is P2−P1, or −108 by taking again the example developed hereinabove. Thus, 108 credits are removed from each credit counter $218_1 \ldots 218_K$. This could bring a credit counter to a negative value. This means that the corresponding virtual channel exceeds the current ceiling P and therefore uses too many memory locations in the input buffer memory 208.

During a step 318, the upstream device 202 checks that the virtual channel of the FLIT considered uses a number of memory locations strictly less than the current ceiling P.

In the example described, this step is implemented by checking that the corresponding credit counter $218_k$ is strictly greater than zero.

During a step 320, the upstream device 202 checks that the input buffer memory 208 has more free memory locations than free reserved locations for all of the virtual channels.

In the example described, this step is implemented by calculating, for each virtual channel, the number of memory locations used by this virtual channel (this number being noted as N(k), where k is the virtual channel), for example by using the formula: $N_U(k)=P-C(k)$, where C(k) is the value of the credit counter 218$_k$. Then, the number of free reserved locations of this virtual channel (noted as $N_{RL}(k)$) is calculated by removing the number of memory locations used by this virtual channel to the number of reserved memory locations $N_R$ and by limiting the result to zero. For example, the following formula: $N_{RL}(k)=\max(NR-N_U(k); 0)$ is used. The total number of free reserved locations (i.e. for all of the virtual channels), noted as $N_{RL}$, is then calculated by adding, on all of the virtual channels, the number of free reserved locations of each virtual channel. For example, the following formula: $N_{RL}=\Sigma_k N_{RL}(k)$ is used. The number of free memory locations in the input buffer memory 208 is for example given by the following formula: $N_L=C-E_U$, where $E_U$ is the number of memory locations used, given by the usage counter 220. The total number of free reserved locations is then compared to the number of free memory locations in the input buffer memory 208.

During a step 322, if the virtual channel k1 uses a number of memory locations strictly less than the current ceiling P and if the input buffer memory 208 has more free memory locations than free reserved locations for all of the virtual channels, the upstream device 202 sends the FLIT F1, decrements the credit counter $C_k$ and increments the usage counter 220. Otherwise, it does not send the FLIT F1 and returns to the step 312 for another FLIT.

During a step 324, the downstream device 204 receives the FLIT F1 and records it in its input buffer memory 208.

In parallel, the following second loop of steps is implemented each time that the downstream device 204 removes from its input buffer memory 208 an FLIT F2 (of which the virtual channel is noted as k2), for example in order to send it to another device.

During a step 326, the downstream device 204 removes the FLIT F2 from its input buffer memory 208.

During a step 328, the downstream device 204 sends a credit for the virtual channel k2 to the upstream device 202, via the communication link 114.

During a step 330, the upstream device 202 receives the credit for the virtual channel k2, increments the credit counter 218$_{k2}$ that corresponds to this virtual channel k2 and decrements the usage counter 220.

It will be appreciated that, in other embodiments, the current ceiling could differ from one virtual channel to the other. For example, the current ceiling of each virtual channel could be calculated furthermore from a history of the use of this virtual channel, so as to decrease the ceiling for the virtual channels with little use in the past and on the contrary to increase it for the virtual channels with high use.

It clearly appears that a method such as the one described hereinabove makes it possible to decrease the quantity of input buffer memory while still retaining good performance.

Note moreover that the invention is not limited to the embodiments described hereinabove. It will appear indeed to those skilled in the art that various modifications can be made to the embodiments described hereinabove, in light of the teachings that have just been disclosed to them. In the detailed presentation of the invention which is made hereinabove, the terms used must not be interpreted as limiting the invention to the embodiments disclosed in this description, but must be interpreted to include therein all of the equivalents of which the foreseeing is within the scope of those skilled in the art by applying their general knowledge to the implementation of the teaching that has just been disclosed to them.

The invention claimed is:

1. A method for sending data from an upstream device to a downstream device, comprising:
   sending, by the upstream device to the downstream device, a piece of data from one virtual channel among a plurality of virtual channels sharing a same input buffer memory of the downstream device, if said one virtual channel uses a number of memory locations of the input buffer memory strictly less than a current ceiling,
   measuring a communication latency between the upstream device and the downstream device,
   calculating the current ceiling from the communication latency.

2. The method according to claim 1, wherein measuring the communication latency comprises measuring a time taken by an exchange of messages between the upstream device and the downstream device.

3. The method according to claim 1 further comprising:
   determining a utilization rate of the input buffer memory, and wherein the current ceiling is
   calculated from the communication latency and from the utilization rate.

4. The method according to claim 3, wherein calculating the current ceiling comprises:
   calculating several possible ceilings from the communication latency,
   selecting, as the current ceiling, one of the several possible ceilings from the utilization rate.

5. The method according to claim 4, wherein the several possible ceilings are respectively associated with adjacent intervals of utilization rates, and wherein the one possible ceiling selected is one in which the utilization rate is located.

6. The method according to claim 5, wherein a lower interval and an upper interval which are adjacent are delimited from one another by a threshold taking
   a high value when the one possible ceiling selected is associated with the lower interval and
   a low value, less than the high value, when the one possible ceiling selected is associated with the upper interval.

7. The method according to claim 1, further comprising:
   calculating, from the communication latency, a reserved number of memory locations for each virtual channel, and wherein the piece of data is sent if the virtual channel uses a number of memory locations strictly less than the current ceiling and if the input buffer memory has more free memory locations than free reserved locations for all of the virtual channels.

8. The method according to claim 1, wherein the upstream device and the downstream device belong to a system comprising: nodes, and
   an interconnection network for the nodes comprising switches and communication links that connect the switches together and to the nodes, wherein each of the upstream device and the downstream device is either one of the nodes or one of the switches.

9. A non-transitory computer readable medium comprising a computer program that can be read by a computer and/or that can be executed by a processor, comprising instructions for executing steps of a method for sending data from an upstream device to a downstream device when said computer program is executed on said computer, said method comprising:

sending, by the upstream device to the downstream device, a piece of data from one virtual channel among a plurality of virtual channels sharing a same input buffer memory of the downstream device, if said one virtual channel uses a number of memory locations of the input buffer memory strictly less than a current ceiling, measuring a communication latency between the upstream device and the downstream device, calculating the current ceiling from the communication latency.

10. A system for sending data comprising:

a downstream device comprising an input buffer memory, an upstream device designed to send a piece of data from one virtual channel among a plurality of virtual channels sharing the input buffer memory, if said one virtual channel uses a number of memory locations of the input buffer memory strictly less than a current ceiling, a measuring system configured to measure a communication latency between the upstream device and the downstream device, a calculating system configured to calculate the current ceiling from the communication latency.

* * * * *